3,019,085
METHOD FOR THE PRODUCTION OF DIBORANE

Carl D. Good, Niagara Falls, N.Y., assignor, by mesne assignments, to Olin Mathieson Chemical Corporation, a corporation of Virginia
No Drawing. Filed May 10, 1955, Ser. No. 507,734
11 Claims. (Cl. 23—204)

My invention relates to a new method for the production of diborane.

It has heretofore been proposed to produce diborane by reacting boron trifluoride and lithium hydride in ether solution. This method suffers from various disadvantages from the standpoint of the materials involved. Thus, the method employs lithium hydride, a hydride of a metal which is not found widely distributed in nature. Hence, it would be desirable to have available a method for the production of diborane based upon the use of a hydride of a metal which is more widely found, for example, sodium. Moreover, the known method is based upon the use of boron trifluoride, and does not involve the use of boron trichloride, a material which the art knows how to produce by passing chlorine gas through a mixture of boric oxide and carbon at elevated temperatures. Finally, the known method involves the use of diethyl ether, a solvent which is hazardous to handle.

In accordance with my present invention, I have devised a method whereby diborane can be produced in good yield in a controllable reaction using a hydride of a metal which is widely found, namely a hydride of sodium, magnesium, or calcium. The process which I have invented, moreover, involves the use of boron trichloride as the source of the boron present in the diborane produced.

The reaction of sodium hydride, magnesium hydride or calcium hydride and boron trichloride to produce diborane is a difficult one to carry out if one is to produce the desired product in good yield. I have discovered, however, that good results from the standpoint of yield and reaction control are obtained provided that the reaction is effected by introducing the boron trichloride into a slurry of the sodium hydride, magnesium hydride or calcium hydride, or mixtures thereof, in benzene, a lower alkylated benzene or a mixture thereof. The reaction mixture must contain, in addition, a halide which is either aluminum trichloride, aluminum tribromide or gallium trichloride or a mixture thereof.

The following examples illustrative in detail various embodiments falling within the scope of my invention. In these examples, the term "moles" signifies gram moles.

Example I

The reactor used was a 500 ml. round-bottomed flask equipped with a thermowell, an addition funnel for solids, and a magnetic stirrer. The reactor was attached to a long spiral condenser which in turn was attached to a series of four collection traps. The condenser was cooled by circulation of methanol which had passed through a solid carbon dioxide-acetone slush. A nitrogen atmosphere was maintained in the reactor at all times. The boron trichloride used was previously purified by distillation through a low temperature fractionation still packed with glass helices and was passed directly from a cylinder to the reactor as a gas.

In the experiment, sodium hydride, aluminum trichloride and boron trichloride were reacted in a medium of benzene to produce diborane. 0.250 mole of sodium hydride (previously ground in a ball mill for four hours and having a purity of 82 percent by weight) was added gradually to a mixture of 0.150 mole of aluminum trichloride and 150 ml. of benzene (previously dried over sodium hydride) contained in the reaction flask and agitated by the magnetic stirrer. The temperature of the mixture of sodium hydride, aluminum trichloride, and benzene was gradually raised from 26° C. to 50° C. over a period of 45 minutes. At a temperature of about 60° C. a noticeable reaction seemed to take place. At the same time the solution, previously colored light yellow by the presence of aluminum trichloride dissolved in the benzene, appeared to lose its color and then became a murky gray in color. The reaction appeared to be slightly exothermic as the temperature of the reactor rose to 68° C.

After cooling the reactor to 40° C., boron trichloride was passed into the solution at a rate of 3.36 millimoles per minute, for a period of 45 minutes. The total amount of boron trichloride added was 0.151 mole. The temperature of the reactor was maintained at 35 to 40° C. during the addition of the boron trichloride. After the addition of the boron trichloride, the temperature of the reactor was raised to 84° C. and maintained there for the remainder of the reaction time, which was four and one-half hours.

The portion of the product which passed through the reflux condenser and the first cold trap (cooled to −80° C. by a Dry Ice-acetone slush) was condensed in the three traps maintained at −196° C. (cooled by liquid nitrogen) when the reactor was flushed by a stream of nitrogen. An infra-red analysis of this product showed that it consisted chiefly of diborane and traces of hydrogen chloride and chlorodiboranes. The quantity of this product was determined by measurement in a calibrated portion of a high vacuum apparatus, of which the cold traps were a part, and found to be 0.0256 mole.

Assuming that the diborane which was produced was of approximately 90 percent purity (estimated from the infrared spectrum of the gas), the resulting yield (based on the active hydrogen content of the sodium hydride) was calculated to be 67.4 percent. This calculation was based on the assumed equation:

$$6NaH + 2BCl_3 \rightarrow B_2H_6 + 6NaCl$$ 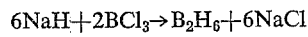

for the overall reaction. If desired, the diborane produced can be further purified by repeated fractional condensations in the known manner.

Example II

In this example, the apparatus employed in Example I was used and the procedure of Example I was substantially repeated. 0.119 mole of calcium hydride and 0.112 mole of aluminum trichloride were heated separately over a period of 30 minutes to a maximum temperature of 85° C. in admixture with 150 ml. of benzene which had been dried overسcodium hydride prior to use. 0.199 mole of boron trichloride was then added slowly at the rate of 7.10 millimoles per minute while the reaction mixture was at a temperature within the range 39–64° C., following which the reaction mixture was refluxed at 63° C. for 15/12 hours. The gas evolved from the reaction mixture was essentially diborane in admixture with a slight amount of hydrogen chloride and a trace of chlorodiborane. The yield of diborane was approximately 65 percent, and here again the diborane produced can be further purified by repeated fractional condensations in the known manner.

Example III

The reactor used was the same as that described in Example I.

0.171 mole of magnesium hydride, 0.4 mole of aluminum trichloride and 0.00463 mole of zinc chloride were added to 150 ml. of benzene which had been dried over sodium hydride. The reaction flask was purged with dry nitrogen and the reactants were agitated with the magnetic stirring bar for 2½ hours at room temperature (24° C.). At that time, boron trichloride was added to the reaction mixture at the rate of 4.76 millimoles per minute for 44 minutes during which time the temperature rose from 28° C. to 58° C. After the addition of the boron trichloride, the temperature of the reactants was held at 59–74° C. for the remaining reaction time of 86 minutes. At the end of the reaction, the product gases were forced by a stream of dry nitrogen through the condenser (cooled with circulating methanol at −78° C.), then through a trap cooled with solid carbon dioxide. The products were finally condensed in a series of three traps cooled with liquid nitrogen. The gas which condensed at −196° C. (liquid nitrogen temperature) was then warmed and purified by passing it through a trap cooled to −130° C. It was then measured in a known volume. The amount of gas measured was 0.0391 mole and by infrared analyses proved to be over 90 percent diborane. On the basis of magnesium hydride present initially, the yield of diborane was 62½ percent. This calculation is based on the assumed equation:

$$3MgH_2 + 2BCl_3 \rightarrow B_2H_6 + 3MgCl_2$$

If desired, the diborane produced can be further purified by repeated fractional condensations.

*Example IV*

The reactor used was the same as that employed in Example I.

0.171 mole of magnesium hydride and 0.4 mole of aluminum trichloride were added to 150 ml. of benzene which had been dried over sodium hydride. The reaction flask was purged with dry nitrogen and the reactants were agitated with the magnetic stirring bar for two hours at room temperature (24° C.). At that time, boron trichloride was added to the reaction mixture at the rate of 4.76 millimoles per minute for 48 minutes during which time the temperature rose from 24° C. to 49° C. After the addition of boron trichloride, the temperature of the reactants was held at 53°–72° C. for the remaining reaction time of 130 minutes. At the end of the reaction, the product gases were forced by a stream of dry nitrogen through the condenser (cooled with circulating methanol at −78° C.), then through a trap cooled with solid carbon dioxide. The products were finally condensed in a series of three traps cooled with liquid nitrogen. The gas which condensed at −196° C. (liquid nitrogen temperature) was then warmed and purified by passing it through a trap cooled to −130° C. It was then measured in a known volume. The amount of gas measured was 0.0319 mole and by infrared analyses proved to be over 90 percent diborane. On the basis of magnesium hydride present initially, the yield of diborane was 56 percent. This calculation is based on the assumed equation:

$$3MgH_2 + 2BCl_3 \rightarrow B_2H_6 + 3MgCl_2$$

The diborane produced can be further purified by repeated fractional condensations.

*Example V*

The reactor used in this experiment was identical with that described for Example I.

In the present experiment 0.208 mole of sodium hydride (previously ground in a ball mill for eight hours and containing 82 percent sodium hydride by analysis) was added gradually to a mixture of 0.5 mole of aluminum tribromide and 150 ml. of benzene (previously dried with sodium hydride) contained in the reaction flask and agitated by the magnetic stirrer. A vigorous reaction took place, raising the temperature of the reaction mixture from room temperature (28° C.) to 60° C. in the period of five minutes. At this time the reaction vessel was cooled by means of an ice bath to prevent the reaction from becoming too vigorous. The temperature of the reactor was maintained at 63° C. to 72° C. while boron trichloride was passed into the solution at a rate of 4.72 millimoles per minute for a period of 30 minutes. The total amount of boron trichloride added was 0.212 mole. After the addition of the boron trichloride had been completed, the temperature of the reactor was raised to 80° C. and maintained at that temperature for the remainder of the reaction time which was 2¾ hours.

The portion of the product which passed through the reflux condenser and the first cold trap (cooled to −80° C. by a solid carbon dioxide-acetone slush) was condensed in the three traps maintained at −196° C. (cooled by liquid nitrogen) when the reactor was flushed by a stream of nitrogen. An infrared analysis of the portion of this product, which passed through a trap cooled to −130° C., indicated that it consisted chiefly of diborane and a small amount of hydrogen chloride. The quantity of this gaseous product was determined to be 0.0288 mole by measurement in a calibrated portion of the high vacuum apparatus of which the cold traps were a part. Assuming that the diborane which was produced was of approximately 70 percent purity (estimated from the infrared spectrum of the gas), the resulting yield (based on the active hydrogen of the sodium hydride) was calculated to be 70 percent. The following equation was assumed for the overall reaction:

$$6NaH + 2BCl_3 \rightarrow B_2H_6 + 6NaCl$$

The diborne produced can be further purified by repeated fractional condensations.

*Example VI*

The reactor used was a 500 ml. round-bottomed flask equipped with a thermowell and a high speed stirrer. The reactor was attached to a series of four collection traps through a long spiral condenser which was cooled by circulation of methanol which had passed through a solid carbon dioxide-acetone slush. A nitrogen atmosphere was maintained in the reactor at all times. In the experiment, boron trichloride (previously purified by distillation through a low temperature glass helices packed fractionation still) was passed directly from a cylinder via a calibrated rotameter to the reactor as a gas.

0.195 mole sodium hydride (previously ground in a ball mill four hours and containing 93.5 percent sodium hydride by analysis) was slurried with 0.375 mole aluminum trichloride for 30 minutes at 60–70° C. in 200 ml. of benzene (previously dried with sodium ribbon). At the end of this time 0.107 mole boron trichloride was added over a period of 30 minutes at temperatures of 60–75° C. After the addition of the boron trichloride, the temperature of the reactants was held at 68–82° C. for the remaining time of one hour. At the end of the reaction, the product gases were forced by a stream of dry nitrogen through the condenser and then through a trap cooled with a solid carbon dioxide-acetone slush (−78° C.). The product gases were finally condensed in a series of three traps cooled with liquid nitrogen (−196° C.). The non-condensable gases were then pumped away and the product gases purified by warming and passing through a trap cooled to −130° C. (vacuum fractionation). This gas was then measured in a calibrated portion of a high vacuum apparatus and was found to consist of 0.0241 mole. Infrared analysis of this gas showed that it consisted of 75 percent diborane. On the basis of the sodium hydride present initially, the yield of diborane was 58 percent. This calculation is based on the assumed equation:

$$6NaH + 2BCl_3 \rightarrow B_2H_6 + 6NaCl$$

The diborane produced can be further purified, if desired, by fractional condensation in the known manner.

Example VII

The apparatus used in this experiment was the same as that described for Example VI.

0.165 mole of sodium hydride analyzing 78.6 percent of sodium hydride and prepared by the reaction of a sodium dispersion in mineral oil with hydrogen was slurried with 0.263 mole of aluminum trichloride at 28–50° C. over a period of 30 minutes in 300 ml. of benzene (previously dried with sodium ribbon). At the end of this time 0.0935 mole of boron trichloride was added over a period of 28 minutes at temperatures of 51–54° C. After the addition of the boron trichloride, the temperature of the reactants was held at 54–80° C. for the remaining reaction time of 1⅔ hours. At the time of the reaction the product gases were collected, purified, and measured as described in Example VI (above). The quantity of gaseous product consisted of 0.0196 mole of essentially pure diborane (contained traces of chlorodiboranes). The yield of diborane, based on the initial sodium hydride, was calculated as 72 percent.

Example VIII

The reactor used was the same as that described for Example VI.

0.172 mole of magnesium hydride of 90 percent purity was reacted with 0.393 mole of aluminum trichloride for approximately 24 hours at room temperature (ca. 24–25° C.) without stirring in 150 ml. of benzene (previously dried with sodium ribbon). At the end of this time, 0.111 mole of boron trichloride was added over a period of 26 minutes at 25–52° C. After addition of the boron trichloride, the temperature of the reactants was held at 78–83° C. for the remaining reaction time of four hours. At the end of the reaction the product gases were collected, purified, and measured as described in Example VI. The quantity of gaseous product consisted of 0.0381 mole of essentially pure diborane. The yield of diborane, based on the initial magnesium hydride, was calculated as 66 percent. The equation assumed for this calculation is $$3MgH_2 + 2BCl_3 \rightarrow B_2H_6 + 3MgCl_2$$

Based on the initial boron trichloride, the yield of diborane is calculated as 69 percent. If desired, the diborane produced can be further purified by fractional condensation.

Example IX

The reactor used in this experiment was the same as that employed in Example VI.

0.158 mole of magnesium hydride of 83.2 percent purity was slurried with 0.323 mole of aluminum trichloride, at 23–28° C. over a period of 150 minutes in 200 ml. of benzene (previously dried over sodium ribbon and calcium hydride). At the end of this time 0.131 mole of boron trichloride was added over a period of 34 minutes at temperatures of 27–50° C. After the addition of the boron trichloride, the temperature of the reactants was held at 50–70° C. for the remaining reaction time of 1¼ hours. At the end of the reaction the product gases were collected, purified, and measured as described in Example VI. The quantity of gaseous product consisted of 0.0445 mole of 90 percent pure diborane (some chlorodiboranes also present). The yield of diborane, based on the initial magnesium hydride, was calculated as 76 percent. If desired, the diborane produced can be further purified by fractional condensation.

Example X 0.0161 mole of magnesium hydride of 83.2 percent purity was mixed with 0.0168 mole of anhydrous gallium trichloride and 15 ml. of benzene (dried with sodium ribbon) in a 150 ml. round-bottomed reaction flask attached via a solid carbon dioxide-acetone cooled condenser directly to a high vacuum apparatus. The reaction bulb was cooled to −196° C. with a liquid nitrogen bath, then evacuated, and 0.0107 mole of boron trichloride was condensed into the reactor. The reactor was left open to a closed portion of the high vacuum system containing a mercury manometer. As the reactor was allowed to warm to room temperature, the benzene melted and the gas pressure in the system rose rapidly. The mixture was then agitated by a magnetic stirrer for one hour at room temperature. At the end of this time the volatile gases were completely transferred to a calibrated portion of the high vacuum apparatus and measured. The product consisted of 0.00370 mole of gas, of which infrared analysis showed that 45 percent of this gas was diborane. The remainder consisted chiefly of unreacted boron trichloride and traces of chlorodiboranes. Based on the initial magnesium hydride, and calculated from the following equation, the yield of diborane was 30 percent.

$$3MgH_2 + 2BCl_3 \rightarrow B_2H_6 + 3MgCl_2$$

If desired, the diborane produced can be separated from the unreacted boron trichloride and other impurities by repeated fractional condensations.

Example XI

The reactor used was the same as that described for Example VI.

0.161 mole of sodium hydride prepared by reacting a sodium metal dispersion in mineral oil with hydrogen and having a purity of 78.6 percent was slurried with 0.300 mole of aluminum trichloride at 26–43° C. over a period of 15 minutes in 300 ml. of xylene (previously dried with sodium ribbon). At the end of this time 0.830 mole of boron trichloride was added at temperature of 43–50° C. over a period of 21 minutes. After the addition of the boron trichloride, the temperature of the reactants was held at 40–92° C. for the remaining reaction time of 3 hours. At the end of the reaction the product gases were collected, purified, and measured as described in Example VI. The quantity of gaseous product consisted of 0.0221 mole of approximately 82 percent diborane and some chlorodiboranes. The yield of diborane, based on the initial sodium hydride, was calculated as 68 percent. If desired, the diborane produced can be further purified by fractional condensation.

Example XII

The reactor used was that described for Example VI.

0.163 mole of sodium hydride prepared by reaction of a sodium dispersion in mineral oil with hydrogen and containing 78.6 percent sodium hydride was slurried with 0.225 mole of aluminum trichloride for 27 minutes at 26–30° C. in 300 ml. of benzene (previously dried with sodium hydride). At the end of this time 0.0585 mole boron trichloride was added over a period of 73 minutes at temperatures from 30–53° C. After the addition of the boron trichloride, the temperature of the reactants was held at 54–68° C. for the remaining time of 3 hours. At the end of the reaction, the product gases were forced by a stream of dry nitrogen through the condenser and then through a trap cooled with a solid carbon dioxide-acetone slush (−78° C.). The product gases were finally condensed in a series of three traps cooled with liquid nitrogen (−196° C.). The non-condensable gases were then pumped away and the product gases purified by warming and passing through a trap cooled to −130° C. (vacuum fractionation). This gas was then measured in a calibrated portion of the high vacuum apparatus and was found to consist of 0.0266 mole. Infrared analysis of this gas showed that it consisted of 97 percent diborane. On the bases of the sodium hydride present initially, the yield of diborane was 95 percent. This calculation is based on the assumed equation:

$$6NaH + 2BCl_3 \rightarrow B_2H_6 + 6NaCl$$

Example XIII

The apparatus used was that described for Example VI.

0.164 mole of sodium hydride prepared by reaction of a sodium dispersion in mineral oil with hydrogen and analyzing 78.6 percent sodium hydride was slurried with 0.225 mole of aluminum trichloride at 25–30° C. over a period of 65 minutes in 300 ml. of benzene (previously dried with sodium hydride). At the end of this time 0.0560 mole of boron trichloride was added over a period of 75 minutes at temperatures of 30–47° C. After the addition of the boron trichloride, the temperature of the reactants was held at 47–80° C. for the remaining reaction time of one hour. At the end of the reaction the product gases were collected, purified, and measured as described in Example VI. The quantity of gaseous product consisted of 0.0285 mole of 95 percent pure diborane (containing traces of chlorodiboranes and boron trichloride). The yield of diborane, based on the initial sodium hydride, was calculated as 99 percent.

Various modifications can be made in the procedures of the specific examples to provide other embodiments which fall within the scope of my invention. In the specific examples, benzene and xylene were employed as a reaction medium, but in their place there can be substiuted other lower alkylated benzenes, particularly those containing a total of not more than six carbon atoms in the alkyl radicals, for example, toluene, ethyl benzene, n-propyl benzene, cumene, 1,2-diethyl benzene, 1,3-diethyl benzene, 1,4-diethylbenzene, p-cymene, 1,3,5-triethylbenzene and 1,3-dimethyl-5-propylbenzene or mixtures thereof. The specific examples also illustrate that the relative proportions of metal hydride, metal halide, boron trichloride and the reaction medium, as well as the reaction temperature, can be varied considerably. In general, however, the reaction mixture will contain from 0.025 to 0.50 mole of metal hydride (sodium hydride, magnesium hydride or calcium hydride) per 100 ml. of reaction medium (benzene, xylene or equivalent) and will contain from 0.025 to 15 moles of metal halide (aluminum tribromide, aluminum trichloride or gallium trichloride) per mole of metal hydride. Also, in general, from 0.2 to 3 moles of boron trichloride per mole of metal hydride is introduced into the reaction mixture. The reaction temperature will generally be within the range from 0 to 120° C.

I claim:

1. A method for the production of diborane which comprises introducing boron trichloride into a slurry of a hydride selected from the group consisting of sodium hydride, magnesium hydride and calcium hydride and a halide selected from the group consisting of aluminum tribromide, aluminum trichloride and gallium trichloride in a reaction medium selected from the group consisting of benzene and an alkyl benzene having a total of not more than six carbon atoms in the alkyl radical maintained at a temperature within the range from 0° to 92° C., and recovering diborane from the reaction mixture.

2. The method of claim 1 wherein the reaction mixture contains from 0.025 to 0.50 gram mole of said hydride per 100 ml. of said reaction medium, wherein the reaction mixture contains from 0.025 to 15 moles of said halide per mole of said hydride, wherein fom 0.2 to 3 moles of boron trichloride are introduced into the reaction mixture per mole of said hydride.

3. The method of claim 2 wherein said hydride is sodium hydride.

4. The method of claim 2 wherein said hydride is calcium hydride.

5. The method of claim 2 wherein said hydride is magnesium hydride.

6. The method of claim 2 wherein said hydride is sodium hydride and wherein said halide is aluminum chloride.

7. The method of claim 2 wherein said hydride is calcium hydride and wherein said halide is aluminum chloride.

8. The method of claim 2 wherein said hydride is magnesium hydride and wherein said halide is aluminum chloride.

9. The method of claim 2 wherein said hydride is sodium hydride, wherein said halide is aluminum chloride and wherein said reaction medium is benzene.

10. The method of claim 2 wherein said hydride is calcium hydride, wherein said halide is aluminum chloride and wherein said reaction medium is benzene.

11. The method of claim 2 wherein said hydride is magnesium hydride, wherein said halide is aluminum chloride and wherein said reaction medium is benzene.

References Cited in the file of this patent

UNITED STATES PATENTS 2,596,690    Hurd   ------------------ May 13, 1952

OTHER REFERENCES

Schechter et al.: "Boron Hydrides and Related Compounds," Jan. 8, 1951, declassified Jan. 5, 1954, Bureau of Aeronautics, Dept. of Navy, pages 11, 13, 20, 22, 23 and 74.

Hurd: "Chemistry of the Hydrides," page 87, John Wiley & Sons, 1952.

UNITED STATES PATENT OFFICE
CERTIFICATE OF CORRECTION

Patent No. 3,019,085 January 30, 1962

Carl D. Good

It is hereby certified that error appears in the above numbered patent requiring correction and that the said Letters Patent should read as corrected below.

Column 1, line 49, for "illustrative" read -- illustrate --; column 3, line 46, for "produtcs" read -- products --; column 6, line 27, for "bydride" read -- hydride --.

Signed and sealed this 26th day of June 1962.

(SEAL)
Attest:

ERNEST W. SWIDER
Attesting Officer

DAVID L. LADD
Commissioner of Patents